ELECTRICALLY PROGRAMMED DELAY

Filed Oct. 7, 1963

INVENTORS
EDWARD M. BUYER
ARTHUR B. KAPLAN
GEORGE M. STRAUSS
BY Nolte & Nolte
ATTORNEYS United States Patent Office
3,369,220
Patented Feb. 13, 1968

3,369,220

ELECTRICALLY PROGRAMMED DELAY

Edward M. Buyer, Bayport, Arthur B. Kaplan, Merrick, and George M. Strauss, Nanuet, N.Y., assignors to Maxon Electronics Corporation, Great River, N.Y., a corporation of New York Filed Oct. 7, 1963, Ser. No. 314,169
4 Claims. (Cl. 340—167)

ABSTRACT OF THE DISCLOSURE

A plurality of N individual delay units connected in series provide different delays progressing successively in powers of 2. The unit with the shortest delay provides a delay of T seconds and that with the longest delay provides a delay of $2^{N-1}T$ seconds. Switches are connected across the respective delay units for selectively short-circuiting such units. Each of the switches includes a control terminal for opening and closing it in response to a binary signal. A pulse is applied to the first of the delay units. A control simultaneously applies a binary signal to each of the control terminals. Additional switches are connected to each of the delay units and the control for preventing the application of a ground voltage to a delay unit when that unit has been short circuited. The additional switches include control terminals for opening and closing their associated switches. The delayed input pulse is derived from the last delay unit and is delayed by an amount proportional to the numerical value of the binary signal.

The present invention relates to delay lines. More specifically, this invention relates to an electronically programmed delay line, wherein the delay provided may be continually related to an analog control voltage.

At present, there is a need for a delay line, particularly in radar applications, which may be dependably adjusted to provide a delay proportional to a continually varying control voltage. Present delay lines which may be continually varied have been found to lack dependability for various reasons. The variable quartz delay line, for example, requires a precarious pressure contact which is undesirable in many applications. Helically wound lines with sliding taps are severely limited with respect to bandwidth. Ultrasonic delay lines require modulating the video signal onto a carrier, as well as post-amplification at the carrier frequency, because of their high insertion loss. Furthermore, the transitional mechanical drives of the prior art (as opposed to rotational drives) are less amenable to complex driving functions, and are relatively expensive.

Accordingly, an object of this invention is to provide a dependable variable delay line.

Another object is to provide a variable delay line whose delay may be continually correlated with the amplitude of a control voltage.

Still another object is to provide a variable delay line which is more amenable to complex driving functions than prior art devices.

Yet another object is to provide a variable delay line having a high delay to rise time ratio.

These and other objects of the invention are accomplished by connecting a plurality of individual delay units in series, each of the delay units having a short-circuiting switch thereacross to selectively remove that unit from the chain. The delay provided by successive stages progresses by powers of 2, and the switching may be controlled by an analog-to-digital converter, whereby the total delay is proportional to the value of the digital number appearing on the output of the converter, and this the analog voltage applied to its input. The resolution of the delay line is equal to the delay of the "shortest" unit, while the total delay is equal to approximately twice the delay of the "longest" unit.

Figure 1:
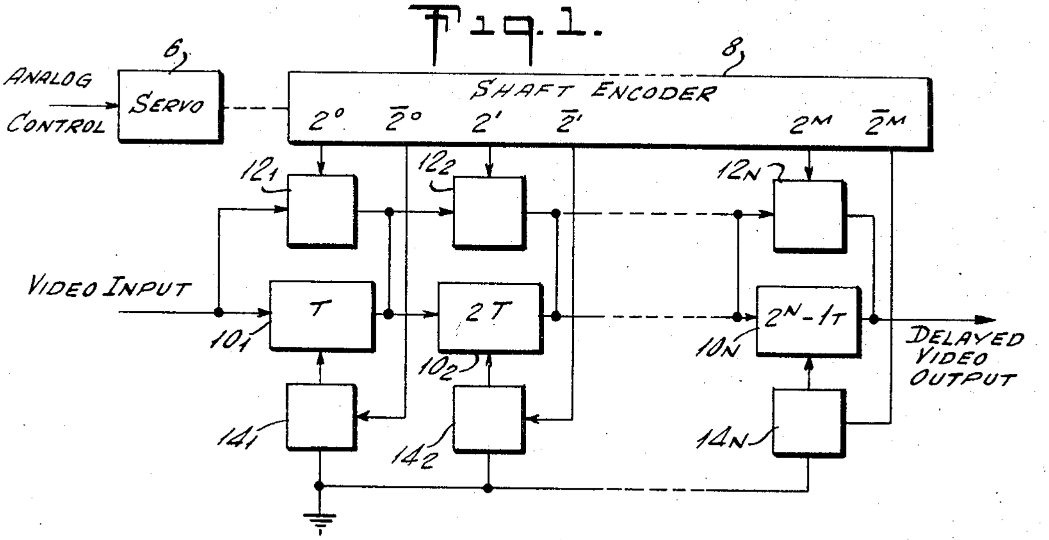
Figure 2:
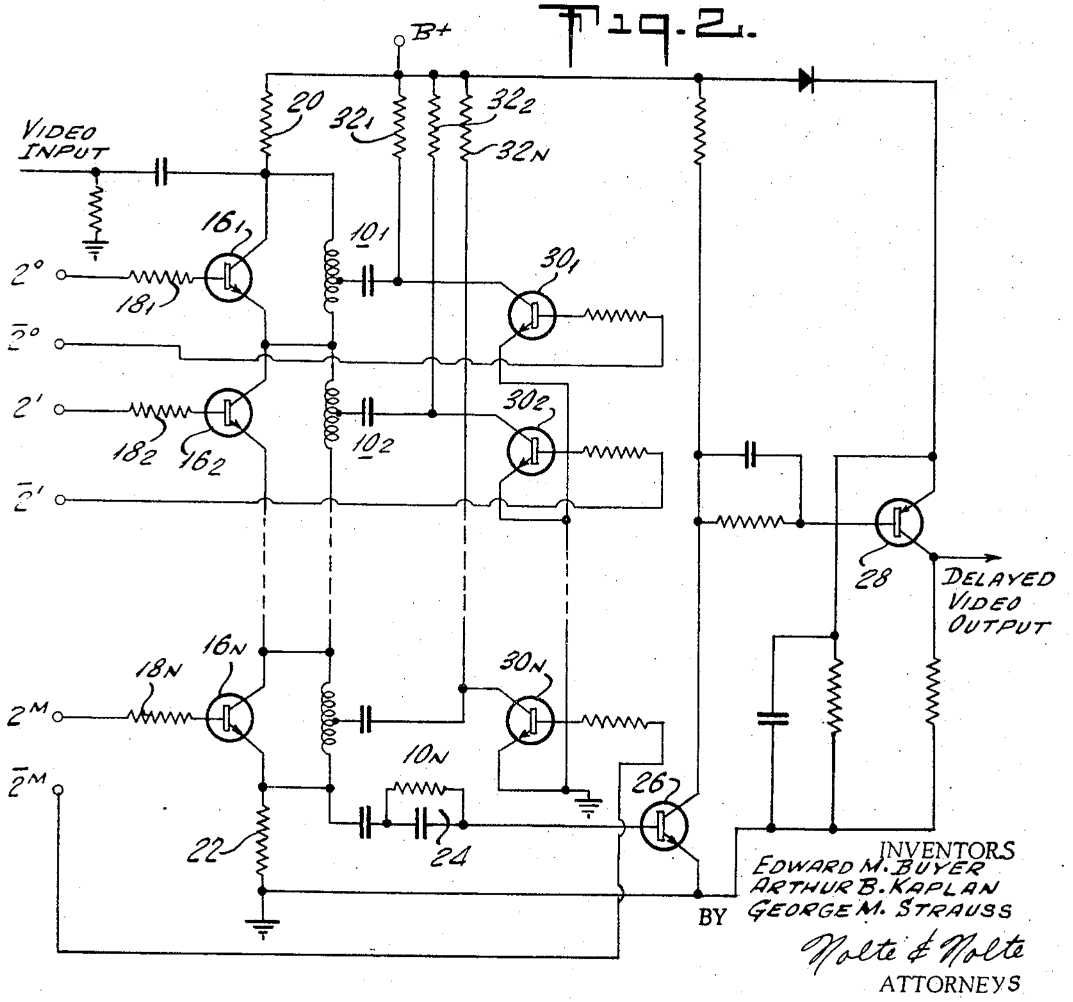

The manner in which the above and other objects of the invention are accompilshed will be explained in greater detail below with reference to the following drawings, wherein:

FIG. 1 is a block diagram of the variable delay line according to the invention; and FIG. 2 is a schematic diagram of the variable delay line.

Referring to FIG. 1, the analog control voltage to which the variable delay should be proportional, is fed to a conventional analog-to-digital converter, which, for example, may comprise servo mechanism 6 and shaft encoder 8. The angular displacement of the servo output shaft is proportional to the amplitude of the voltage appearing at the servo input. The output shaft of servo 6 is mechanically coupled to shaft encoder 8, which includes a plurality of output channels $2^0$, $2^1$, . . . $2^M$, on which a binary number and its complement appear. The value of this number is proportional to the angular displacement of the servo output shaft and thus the amplitude of the input control voltage. Encoder 8 may have any desired number of channels, which, as will be clear to one skilled in the art, will determine the maximum delay, and thus the range of the system. In a preferred embodiment, a seven-channel encoder was employed.

The delay line itself consists of a plurality of series connected, lumped parameter delay units $10_1$, $10_2$, . . . $10_N$. If a resolution of T seconds is desired, the delay unit $10_1$ must provide a delay of T seconds. The remaining delay units have delays which progress by powers of 2, so that the second channel has a delay of 2T seconds and the last stage $10_N$ provides a delay of $2^{N-1}$ seconds, where N is equal to the number of delay units. As shown, the undelayed video input is applied to the input of delay unit $10_1$ and the delay video output derived from the output of the last delay unit $10_N$.

According to the invention, a pluralty of individual switches $12_1$, $12_2$, . . . $12_N$ are connected across respective delay units, $10_1$, $10_2$, . . . $10_N$. These switches, as will be explained in detail below, are adapted to be opened or closed in accordance with the output of shaft encoder 8. For example, the switches may be normally closed, short circuiting the entire delay line, but adapted to be opened upon the appearance of a binary signal on respective control leads. Since a minimum delay of T seconds is provided by delay unit $10_1$, the variable delay line of the invention is capable of providing a delay between zero and $(2^{N-1})$ T seconds with a resolution of T seconds. For practical purposes, to provide approximately twelve microseconds delay, the largest delay line should have a delay of six microseconds, and the smallest a delay of .09375 microsecond.

If the delay line is merely short-circuited to eliminate delay, signals and switching transients will continue to propagate, due to the mismatch at both ends and to the fact that the outputs are returned to the input. To eliminate this difficulty, a plurality of additional switches $14_1$, $14_2$, . . . $14_N$, associated with respective delay units $10_1$, $10_2$, . . . $10_N$, are coupled to the complement ($2^{-0}$, $2^{-1}$, . . . $2^{-M}$), outputs of each channel of encoder 8. The presence of a "1" at the input of any of these additional switches closes that switch and maintains the ground voltage on the delay line to which it is coupled. When a "0" appears on a complement output of encoder 8, the switch controlled by that output is closed, preventing application of the ground voltage to the respective delay unit. Since the presence of a "0" on the complement output necessitates the appearance of a "1" on the normal output connected to the switches $10_1$, $10_2$, . . . $10_N$, which shorts out the corresponding delay line, this action effectively removes the ground connection from the short-circuited delay units, preventing propagation of unwanted signals.

FIG. 2 is a schematic diagram of the circuits corresponding to the switches and delay units illustrated in block diagram form in FIGURE 1. Identical numbers have been used in FIGURE 2 to designate components corresponding to the blocks of FIGURE 1. Thus, switches $12_1$, $12_2$, . . . $12_N$ may comprise transistors $16_1$, $16_2$, . . . $16_N$ having their collectors connected to one end of conventional lumped parameter delay units $10_1$, $10_2$, . . . $10_N$ and their emitters connected to the other end. The bases of the transistors are connected through resistors $18_1$, $18_2$, . . . $18_N$ to shaft encoder outputs $2^0$, $2^1$ and $2^M$, respectively. The emitter of each transistor is connected to the collector of the following transistor, the collector of transistor $16_1$ being coupled via resistor 20 to the B+ supply. The emitter of transistor $16_N$ is connected to ground through resistor 22. The output from the delay line is derived from the emitter of transistor $16_N$ which is coupled across the last delay unit $10_N$ and is coupled through RC circuit 24 to the input of a two-stage amplifier consisting of transistors 26 and 28, operating in a known manner to provide the delay video output pulse at the collector of transistor 28.

The switches $14_1$, $14_2$, . . . $14_N$ comprise transistors, $30_1$, $30_2$, . . . $30_N$, but in this instance, the emitter of each transistor is connected to ground, and the collector connected through respective resistors $32_1$, $32_2$, . . . $32_N$ to the B+ supply. The bases of these transistors are connected through resistors $34_1$, $34_2$, . . . $34_N$ to the $2^{-0}$, $2^{-1}$, and $2^{-M}$ output channels of binary shaft encoder 8.

The operation of the circuit is as follows. Assume that the analog control voltage has caused servo 6 to rotate its output to a position whereby the output of shaft encoder 8 comprises a ground voltage on the $2^0$ and $2^M$ control leads, and a positive voltage at the $2^1$ control. Simultaneously, positive voltages will appear on the $2^{-0}$ and $2^{-M}$ channels and a ground voltage on the $2^{-1}$ channel. The relatively negative voltages applied to the bases of transistors $16_1$ and $16_N$ will drive these transistors to cut-off (the bases being more negative that the emitters), thus opening the circuit across delay units $10_1$ and $10_N$. At the same time, the positive voltages on the bases of transistors $30_1$ and $30_N$ cause these transistors to conduct and permit the application of a ground voltage to delay units $10_1$ and $10_N$. Transistor $16_2$, however, has a positive voltage applied to its base, causing the base to become more positive than the emitters and causing this transistor to conduct (saturate), thus short-circuiting delay unit $10_2$. Hence, the video input signal is passed through delay $10_1$, around delay $10_2$ through conducting transistor $16_2$, and finally through delay $10_N$. Hence, the video input pulse is subjected to the combined delays of units $10_1$ and $10_N$, which is equal to $T(2^{N-1}+1)$ seconds. The relatively negative base to emitter voltage applied to transistor $30_2$ prevents application of a ground voltage to the short-circuited delay unit $10_2$ for the purposes noted above. The delayed output pulse is then derived through amplifiers 26 and 28.

Thus, the invention provides an electronically programmed delay line which avoids many of the drawbacks of prior art systems and is dependable and accurate. The use of the lumped parameter delay units improves the dependability of the system and provides better fidelity than helically wound lines with sliding taps, while the rotational mechanical drive is less expensive and "quieter" than a translational drive, and enables better response to relatively complex driving functions.

Although a preferred embodiment of the invention has been described, many modifications thereof would be obvious to one skilled in the art. For instance, the switches, instead of simply short-circuiting a delay unit to remove it from the line, might route the signal through a T-pad attenuator having the same impedance and insertion loss as the unit switched out. This would keep total attenuation through the network constant regardless of the delay command. Other modifications will also be obvious, and the invention should not be limited except as defined in the following claims:

What is claimed is:

1. A variable delay line, comprising:

N individual delay units, said delay units providing different delays and being connected in series, the delays of successive units progressing by powers of 2, whereby the unit with the shortest delay is adapted to provide a delay of T seconds and the unit with the longest delay is adapted to provide a delay of $2^{N-1}T$ seconds;

switch means connected across respective delay units for selectively short-circuiting said delay units, each of said switch means including a control terminal adapted to open and close its associated switch in response to a binary signal;

means for applying a pulse to be delayed to the first of said delay units;

control means for simultaneously applying a binary signal to each of said control terminals;

additional switch means connected to each of said delay units and said control means for preventing the application of a ground voltage to a delay unit when that unit has been short-circuited, said additional switch means also including respective control terminals for opening and closing their associated switch means; and means for deriving the delayed input pulse from the last delay unit, whereby said pulse is delayed by an amount proportional to the numerical value of said binary signal.

2. A variable delay line according to claim 1, wherein said control means comprises an analog to digital converter having a first plurality of parallel output channels for representing a binary number, and a second plurality of parallel output channels for representing the complement of said number, said first plurality being coupled to respective control terminals of the first mentioned switch means, and said second plurality being coupled to respective control terminals of said additional switch means.

3. A variable delay line according to claim 2, wherein all of said switch means comprise semi-conductor switches.

4. A variable delay line, comprising:

a plurality of lumped parameter delay units, said delay units being connected in series, each of said units being adapted to provide a delay of $2^{N-1}T$ seconds, wherein N equals the position of a given delay unit in said series connection;

switch means connected across respective delay units for selectively shorting said delay units;

means for applying an input pulse to the first of said delay units;

control means responsive to a variable control voltage for simultaneously applying a binary signal proportional to said voltages to each of said switch means for actuation thereof, said control means including a servo for rotatably positioning a shaft in response to said voltage and a binary shaft encoder for converting said shaft position to said binary signal;

additional switch means connected to each of said delay units and said shaft encoder for preventing the application of a ground voltage to a delay line when that delay line has been short-circuited; and means for deriving the delayed input pulse from the last delay unit, whereby said pulse is delayed by an amount proportional to the numerical value of said binary signal.

References Cited

UNITED STATES PATENTS

| | | | |
|---|---|---|---|
| 2,915,688 | 12/1959 | Wilde | 340—203 X |
| 3,001,137 | 9/1961 | Kassell et al. | 328—56 X |

THOMAS B. HABECKER, *Acting Primary Examiner.*

NEIL C. READ, *Examiner.*

D. J. YUSKO, *Assistant Examiner.*